Patented Jan. 27, 1931

1,790,520

UNITED STATES PATENT OFFICE

HAROLD S. DAVIS, OF BELMONT, MASSACHUSETTS, ASSIGNOR, BY MESNE ASSIGNMENTS, TO PETROLEUM CHEMICAL CORPORATION, OF NEW YORK, N. Y., A CORPORATION OF DELAWARE

PREPARATION OF SECONDARY ALKYL SULPHATES

No Drawing. Application filed October 28, 1925, Serial No. 65,498. Renewed June 13, 1930.

This invention provides an improved process for the treatment of hydrocarbon mixtures including the separation and recovery of derivatives of the more reactive and more highly unsaturated hydrocarbons of the mixture and the utilization of olefines prepared for utilization by the extraction of the said more reactive components of the mixture. The remaining olefines may, for example, be converted into alcohols or other compounds; the invention also relates to products resulting from this treatment.

Processes within this invention are particularly suitable to treatment of hydrocarbon mixtures obtained by the thermal decomposition or cracking of mineral hydrocarbons, such as petroleum, oil-shale, and the like, and are likewise advantageously to be applied to any mixture of unsaturated hydrocarbon substances of differing reactivity to the recommended reagents. Petroleum and shale oil may be hereinafter generically designated by the term "mineral oil".

A complete effluent hydrocarbon mixture obtained, for example, by vapor-phase cracking of suitable oils may be subjected directly to treatment with advantage, but it is ordinarily desirable to separate the material worked upon into fractions having relatively higher proportional contents than the whole effluent mixture of unsaturated hydrocarbons desired to be recovered or combined. The unsaturated hydrocarbons so concentrated or accumulated as a group may be members of the olefine series, for an example of unsaturated bodies effectively converted into a desirable class of products. These products are compounds of the olefines of such base structure as to form upon combination with water tertiary alcohols; and may include the compounds of olefines of such structure as to form upon combination with water secondary alcohols. For convenience these olefines are hereinafter mentioned as "tertiary base" and "secondary base" olefines.

For such concentration or accumulation, a simple fractional distillation of cracked vapors stripped of condensates of the boiling point range of commercial gasoline, and of higher boiling points, is often sufficient; the lower boiling fraction, for example, being separately collected and condensed with or without the superposition of pressure to effect absorption in this liquid fraction of absorbable normally gaseous constituents such as the butylenes.

Whatever the mode of preparation, a liquid fraction of the condensate from the vaporous efflux of relatively high temperature vapor-phase cracking, containing substantially only those constituents having boiling points of approximately 100° C. or lower, and with or without normally gaseous products in solution, is an advantageous material for treatment according to this invention. This liquid product usually contains the following types of hydrocarbon compounds:

I. Saturated hydrocarbons in small proportional volumes or negligible traces;

II. Olefines comprising hexylenes, amylenes and butylenes of (a) Secondary base structure, typically

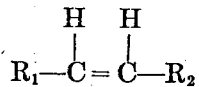

(b) Tertiary base structure, typically

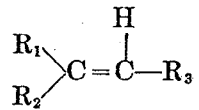

(in which expressions $R_1$, $R_2$, and $R_3$ may severally represent hydrocarbon radicals, such as $CH_3$, $CH_3 CH_2$, etc. or, in the limiting case, $R_3$ may be a hydrogen atom);

III. Propylene and ethylene in solution;

IV. Diolefines including
  Propadiene
  Butadienes
  Pentadienes;

V. Acetylenes sometimes;

VI. Cyclic hydrocarbons, in small volumes.

The proportional content of hydrocarbons of the olefine series in the preferred material is relatively high.

Of the unsaturated compounds which may be ordinarily expected to appear in such mixtures, the several lower members of the olefine series and their isomers may be taken as representative. For example, any given mixture may contain:

| Group (a) | Group (b) |
|---|---|
| Tertiary base structure | Secondary base structure |
|  | Propylene |
|  | Butene-1 |
|  | Butene-2 |
| Iso-butylene | Pentene-1 |
|  | Pentene-2 |
|  | Isopropyl-ethylene |
| Unsymmetrical methyl-ethyl ethylene |  |
| Tri-methyl-ethylene |  |

Hexylenes (ten known isomeric forms for example):

| Tetra-methyl-ethylene and other hexylenes capable of yielding tertiary alcohols. | Hexene-2 and other hexylenes capable of yielding secondary alcohols. |
|---|---|

Of this class of hydrocarbon mixtures, group (a) is structurally capable of conversion into tertiary derivatives, while the remainder (b) may form secondary derivatives (such as the secondary alcohols).

The tertiary base structure olefines of group (a) and the secondary base structure olefines of group (b) react with markedly different avidity into addition compounds with hydrogen halides, such as hydrogen chloride, under appropriate conditions. This difference is utilized by this invention to effect a separation respectively of the members of these groups and other hydrocarbons admixed therewith.

A typical characteristic of the hydrogen halide hydrocarbon compounds, important in this relation, is that they are respectively of substantially higher boiling points than the hydrocarbons from which they are derived, or with which they may be initially admixed in the mentioned materials for treatment. The several boiling points are of such a wide range that the compounds are mutually separable one from another with relative ease and certainty by distillation. While for some uses the mixed hydrogen halide hydrocarbon compounds may be satisfactory without separation, ordinarily it is desirable to isolate the several compounds of the reaction mixture. For any such separation the diversity of boiling temperatures of said compounds is of primary importance and value.

Postulating that a purpose of the treatment is to make, separate and utilize valuable hydrocarbon derivatives, including the tertiary base structure olefines, and/or their useful compounds, and to so effect their conversion as to obtain a high yield of the desired products, the reaction with a hydrogen halide provides an advantageous first treatment.

In the well-known reaction of sulfuric acid upon such mixtures of olefines and diolefines to secure alkyl sulphates hydrolyzable to alcohols, for example, the more highly unsaturated hydrocarbons and the tertiary base olefines are polymerized to higher-boiling hydrocarbons, which are not such valuable product as may be realized from the materials by a treatment conserving and utilizing the tertiary base materials.

In a typical species of the present invention the light liquid fraction of the hydrocarbon products of the preferred material is first brought into intimate contact with a hydrogen halide. This substance may be carried for this contact in any appropriate menstruum (conveniently in aqueous solution) under conditions to selectively react upon the tertiary base olefines; the excess of hydrogen halide reagent solution, if any, is separated from the remainder, and the hydrogen halide compounds are segregated from the unchanged secondary base olefines, and the uncombined water, if any. Instead of water, other liquids may be used as a carrying medium for the hydrogen halide; liquids of the type of acetic acid which form a homogeneous solution with the olefines are particularly effective.

The secondary base olefines can now be advantageously recovered for further treatment. Since the halogen acid products are uniformly of higher boiling points than either the hydrocarbons from which they are derived or the corresponding isomeric olefines of secondary base structure, the separation of the tertiary base can be readily and substantially completely effected by fractional distillation. Or these products may be first hydrolyzed, and the resulting hydrolyzed mixture then distilled, with some advantage, since the alcohols are also of higher boiling point than the corresponding hydrocarbons.

In a recommended application of the process to commercial practice, the material to be treated may be condensed effluent hydrocarbon vapors obtained from a cracking operation carried out upon a crude gas oil fraction, characterized by a maximum cracking temperature in the vicinity of 600° C., a prolonged maintenance of this cracking temperature in vapor-phase, and a final fractionation of the efflux vapors, as by selective condensation or redistillation of the resulting product. For example, in the instance to be described, the fraction which is distilled over from the total product of the cracking operation, up to a temperature of 100° C., may be liquefied by suitable control of pressure and temperature or either, and used as the raw material.

This liquid hydrocarbon distillate is placed in a suitable container provided with a mixer and lined with a material resistant to the hydrogen halide which is to be used. The container is preferably closed. The apparatus may be of suitable construction to permit the charge to be subjected to superposed pressure sufficient substantially to maintain the contents liquid. It is desirable that the container shall be jacketed in order to provide for control of the temperature of the reaction mixture by flow of a heating or cooling medium in the jacket during treatment.

A hydrogen halide, which may be associated with water, for example a concentrated aqueous solution of hydrogen chloride (sp. gr. approximately 1.20) in an amount preferably exceeding approximately one-half the volume of hydrocarbons treated, is mixed with the hydrocarbon material in the reaction vessel and the mixture thoroughly agitated. A cooling liquid such as cold water or chilled brine, is simultaneously circulated through the jacket of the vessel. Meanwhile hydrogen chloride gas may be and preferably is introduced into the mixing chamber in such amount as to maintain the aqueous solution at substantially its initial concentration, or above, e. g., at its saturation point at the attained lower temperature; and at a rate to permit maintenance of the temperature below 20° C. and preferably in the vicinity of 4° C. These lower temperatures are desirable not because the reactions will not proceed satisfactorily at higher temperatures but largely because the reaction is apparently facilitated by the presence of water and because the solubilities of the hydrogen halides in water severally decrease with rise in temperature. On the other hand, the rate of reaction between the unsaturated compounds and a solution of hydrogen halide of definite concentration increases as the temperature rises. Accordingly it is sometimes advantageous to carry out the process at temperatures above the specified temperature limits and/or under increased pressure. The mixing operation is continued for such time as may, under given operating conditions, prove necessary. This may be determined by observation of the refractive indices of samples of the mixture, withdrawn at periodic intervals, and the mixing operation continued until such successive readings remain constant. Reaction times varying from fifteen minutes to several hours in accordance with the temperature and the proportion of the more difficultly reactive tertiary base bodies in the mixture have been observed.

The reaction mixture thus obtained, upon separation of the surplus aqueous solution of hydrochloric acid by gravity, will be found to contain chlorides of the olefines of group (a) above referred to, which may be segregated from the unchanged hydrocarbons and are characterized by relatively higher and more diversified boiling points with respect to the original hydrocarbons from which they are derived. For example:—

| Substances | Boiling Point | Source substance | Boiling point |
|---|---|---|---|
| Tertiary butyl chloride | 50–51° C. | Iso butylene | −6° C. |
| Tertiary amyl chloride: (2 chlor-2 methyl-butane) | | Tri-methyl-ethylene | 37° C. |
| 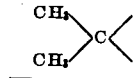 | 81–88° C. | Unsymmetrical methyl-ethyl ethylene | 31–33° C. |

Other chloride derivatives of the several hydrocarbons are also characterized by diverse boiling points in relation to each other and by the indicated increase of boiling point relatively to their source materials.

If the end-point of the hydrocarbon fraction treated with hydrochloric acid as above specified shall for example, be 45° C., the unconverted olefines, for the most part those of secondary base structure, readily separate by simple fractional distillation from the hydrocarbon chlorides. The secondary base olefines may thus be obtained in optimum condition for subsequent treatment.

In the instance of processing an original raw material or fraction containing a wider range of hydrocarbons, boiling for example up to 100° C., the monochlorhydrocarbons derived from the tertiary base olefines of four, five and six carbon atoms in some cases exhibit boiling points not widely different from the boiling points of unconverted hydrocarbons of six and seven carbon atoms. The preferred procedure for the treatment of such mixtures is to separate the unconverted hydrocarbons boiling up to 45° C. by distillation from the higher boiling constituents of the halide reaction mixture; then to hydrolyze the residue; and then to extract the resulting alcohols from their admixture with hydrocarbons, as by causing their preferential solution in water. The unconverted hydrocarbon residues thus obtained may be returned severally or collectively to the first hydrohalogenation stage of the process, if their content of tertiary olefines warrants retreatment; or they may be subjected separately to treatment for the conversion to compounds of secondary base olefines, to form ultimately appropriate products such as secondary alcohols.

The unchanged hydrocarbon distillate and/or residues of the hydrohalogenation treament has now been stripped of substances having high degrees of reactivity towards acids, and is therefore in condition for subsequent treatment with appropriate reagents to form acid addition products or esters without complications growing out of violent and heat producing reactions with a reagent of sufficient concentration to be an effective reactant upon the secondary base olefines. The hydrocarbon material may therefore be treated with acid, preferably sulfuric acid of appropriate concentration to effect conversion into secondary derivatives, from which the secondary alcohols may be obtained by subsequent hydrolysis. In this secondary stage successive extractions with acid of one concentration may be resorted to, though I prefer to employ two concentrations; the number of treatments severally for absorption of the secondary-base-structure olefines resorted to depends upon the material treated and the result desired. Satisfactory results are obtained in the instance of the preferred material, heretofore referred to by treatments, severally, with two successive portions of sulfuric acid of 77% concentration, followed by one treatment with sulfuric acid of 86% concentration; but acid diluted to 70% may be used in the first treatment and acid as strong as 95% in the last treatment, if some losses of ultimate alcohol may be tolerated. This treatment may be carried out with agitation in the same vessel employed for the hydrohalogenation preliminary treatment at temperatures between 35° C. and 40° C., the sulfuric-acid hydrocarbon mixture at the end of treatment being allowed to stratify, and the acid product discharged to a dilution tank. The hydrocarbon residuum may now be treated with a second portion of 77% sulfuric acid, followed by treatment with an adequate volume of sulfuric acid of 86% concentration, and the acid or aqueous material separated run into a dilution tank. The respective dilute acid and aqueous separated material may now be distilled to recover secondary alcohols resulting from hydrolysis of the secondary base acid compound. I do not herein claim the specific secondary base sulfuric acid treatment, which is described and claimed in my application for Letters Patent Serial No. 43,208 filed July 13, 1925, and I do not herein claim the generic process nor the different species described and claimed in my application for patent Serial No. 65,497 filed of even date herewith.

What I claim is:

1. Process for the preparation of secondary alkyl sulphates of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride while maintaining such a concentration of hydrogen chloride and temperature as will selectively convert substantially all the tertiary olefines present into hydrogen chloride addition products, separating the unchanged hydrocarbon constituents from the converted tertiary olefines, and sulphating the secondary olefines contained in said separated unchanged hydrocarbon constituents by admixing the said unchanged hydrocarbon constituents with aqueous sulphuric acid, while maintaining an acid concentration and a temperature at which sulphation of said secondary olefines takes place.

2. Process for the preparation of secondary alkyl sulphates of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride while maintaining such an acid concentration and a temperature as will selectively convert substantially all the tertiary olefines present into hydrogen chloride addition products, separating the unchanged hydrocarbon constituents from the converted olefines, sulphating the secondary olefines contained in said separated unchanged hydrocarbon constituents by admixing said unchanged hydrocarbon constituents with aqueous sulphuric acid of from 70 to 95%, $H_2SO_4$ content, while maintaining a temperature at which sulphation of said secondary olefines takes place.

3. Process for the preparation of secondary alkyl sulphates of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride while maintaining such a concentration of hydrogen chloride and temperature as will selectively convert substantially all the tertiary olefines present into hydrogen chloride addition products, separating the unchanged hydrocarbon constituents from the converted tertiary olefines, and sulphating the secondary olefines contained in said separated unchanged hydrocarbon constituents by admixing said unchanged hydrocarbon constituents with aqueous sulphuric acid of from 70 to 77%, $H_2SO_4$ content, while maintaining a temperature at which sulphation of said secondary olefines takes place.

4. Process for the preparation of secondary alkyl sulphates of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride at temperatures not exceeding 20° C., while maintaining such an acid concentration as will selectively convert substantially all the tertiary olefines present into hydrogen chloride addition products, separating the unchanged hydrocarbon constituents from the converted tertiary olefines, and thereafter sulphating the secondary olefines contained in said separated unchanged hydrocarbon constituents by admixing said unchanged hydrocarbon constituents with aqueous sulphuric acid, while maintaining an acid concentration and a temperature at which sulphation of said secondary olefines takes place.

5. Process for the preparation of secondary alkyl sulphates of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination at temperatures from 4° C. to 20° C., while maintaining such an acid concentration as will selectively convert subtantially all the tertiary olefines present into hydrogen chloride addition products, separating the unchanged hydrocarbon constituents from the converted tertiary olefines, and sulphating the secondary olefines contained in said separated unchanged hydrocarbon constituents by admixing said unchanged hydrocarbon constituents with aqueous sulphuric acid, while maintaining an acid concentration and a temperature at which sulphation of said secondary olefines takes place.

6. Process for the preparation of secondary alkyl sulphates of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride while maintaining such a concentration of hydrogen chloride and temperature as will selectively convert substantially all the tertiary olefines present into hydrogen chloride addition products, separating the unchanged hydrocarbon constituents from the converted tertiary olefines by fractional distillation, and sulphating the secondary olefines contained in said separated unchanged hydrocarbon constituents by admixing said unchanged hydrocarbon constituents with aqueous sulphuric acid while maintaining an acid concentration and a temperature at which sulphation of said secondary olefines takes place.

7. Process for the preparation of secondary alkyl sulphates of not exceeding 6 carbon atoms to the molecule from a mixture of hydrocarbons derived from the pyrolysis of mineral oil and containing olefines, said olefines consisting predominantly of secondary and tertiary olefines of not exceeding 6 carbon atoms to the molecule, comprising as steps subjecting said mixture to hydrochlorination with hydrogen chloride in solution in acetic acid while maintaining such an acid concentration and temperature as will selectively convert substantially all the tertiary olefines present into hydrogen chloride addition products, separating the unchanged hydrocarbon constituents from the converted tertiary olefines, and sulphating the secondary olefines contained in said separated unchanged hydrocarbon constituents by admixing said unchanged hydrocarbon constituents with aqueous sulphuric acid, while maintaining an acid concentration and a temperature at which sulphation of said secondary olefines takes place.

Signed by me at Cambridge, Massachusetts, this twenty-sixth day of October 1925.

HAROLD S. DAVIS.